United States Patent [19]

Gribbin et al.

[11] Patent Number: 5,186,974

[45] Date of Patent: * Feb. 16, 1993

[54] SELF-SUPPORTING SHEET-LIKE STRUCTURE COMPRISING A SUBSTRATE AND A COATING, AND A PROCESS FOR ITS PRODUCTION

[75] Inventors: John D. Gribbin, Schlangenbad; Lothar Bothe, Mainz; Peter Dinter, Oestrich-Winkel; Hermann Dallmann, Wiesbaden, all of Fed. Rep. of Germany

[73] Assignee: Hoechst Aktiengesellschaft, Frankfurt am Main, Fed. Rep. of Germany

[*] Notice: The portion of the term of this patent subsequent to May 29, 2007 has been disclaimed.

[21] Appl. No.: 593,444

[22] Filed: Oct. 5, 1990

Related U.S. Application Data

[62] Division of Ser. No. 391,076, Aug. 8, 1989.

[30] Foreign Application Priority Data

Aug. 16, 1988 [DE] Fed. Rep. of Germany ....... 3827632
Aug. 16, 1988 [DE] Fed. Rep. of Germany ....... 3827634

[51] Int. Cl.$^5$ ............................ B05D 3/06; H05F 3/00
[52] U.S. Cl. ..................................... 427/536; 427/570; 204/169; 204/170; 204/164
[58] Field of Search .................. 427/38, 39, 40, 41; 204/164, 165, 168, 169, 170

[56] References Cited

U.S. PATENT DOCUMENTS

| | | | |
|---|---|---|---|
| 4,508,049 | 4/1985 | Behn et al. | 427/41 |
| 4,615,906 | 10/1986 | Kolbe et al. | 427/40 |
| 4,693,799 | 9/1989 | Yanagihara et al. | 427/41 |
| 4,929,319 | 5/1990 | Dinter et al. | 427/40 |
| 4,940,521 | 7/1990 | Dinter et al. | 427/40 |
| 4,970,093 | 11/1990 | Sievers et al. | 27/38 |

*Primary Examiner*—Marianne Padgett
*Attorney, Agent, or Firm*—Gregory N. Clements

[57] ABSTRACT

A self-supporting sheet-like structure comprises a coating, which reduces sliding friction, on at least one surface of the substrate. The slip-improving coating is produced by treating this substrate surface by means of an electric corona discharge between a high voltage electrode and a grounded counter-electrode while simultaneously spraying an aerosol into the corona discharge zone. The aerosol contains a film-forming agent as a slip agent, for example aqueous solutions or emulsions of monoesters of glycerol and long-chain fatty acids.

7 Claims, 2 Drawing Sheets

SELF-SUPPORTING SHEET-LIKE STRUCTURE COMPRISING A SUBSTRATE AND A COATING, AND A PROCESS FOR ITS PRODUCTION

This is a division of application Ser. No. 07/391,076 filed Aug. 8, 1989.

BACKGROUND OF THE INVENTION

1) Field of the Invention

The present invention relates to a self-supporting sheet-like structure containing a substrate layer and a coating on at least one surface of the substrate layer. The coating composition includes a film-forming agent.

The invention furthermore relates to a process for the production of a sheet-like structure according to the invention, having a coating. The coating is applied as an aerosol simultaneously with a corona treatment to the sheet-like structure.

2) Prior Art

In the case of sheet-like moldings of polymeric materials, such as films or sheets, inadequate slip and frictional properties during production and further processing of the said materials lead to many undesirable problems. Static friction and sliding friction and blocking against one another and against guide or direction-changing elements, such as, for example, rollers, are examples of some of the undesirable problems.

A conventional suitable solution for solving this problem consists of incorporating in the material of the substrate layer inert particles which lead to a certain surface structure and thus have an advantageous effect on the sliding behavior of the molding. Examples of such inert particles, which can be incorporated either during the preparation of the thermoplastic or via a masterbatch during production of the molding, are inorganic natural or synthetic compounds, such as $BaSO_4$, $CaCO_3$, $TiO_2$, kaolin, Ca phosphates, etc., or organic particles, for example those consisting of crosslinked acrylates. The concentrations vary within wide limits, i.e., in the range from 0.001 to 1.0% by weight.

As already mentioned, a substantial improvement in the sliding properties of the moldings can be achieved by this solution, which also has an advantageous effect on the performance characteristics of the articles produced therefrom.

However, the disadvantage here is that the inert particles, before incorporation, have to be subjected to a very complicated, expensive treatment process in order to avoid other disadvantages, such as, for example, increased abrasion on contact with guide elements and the like. Furthermore, the optical properties of the substrates can also be adversely affected in some cases.

EP-A-0 153 853 describes a substrate film for a magnetic tape, the said film having a net-like coating which contains fine particles and imparts the necessary frictional properties to the said substrate film. In this process, the coating materials, such as the polymeric binders containing colloidal silicates, have to be mixed together and the mixture applied to the surface of the substrate between the individual orientation steps. One of the disadvantages of this process is that the formation of the structures necessitates at least one stretching step, i.e., is linked with the process for the production of the film.

SUMMARY OF THE INVENTION

It is the object of the present invention to provide sheet-like structures, such as films, sheets and the like, which are easy to handle and have slip-promoting surfaces, where the slip-promoting substances and the structures resulting from these can be applied independently of the production process and are still permanently and firmly anchored to the substrate.

This object is achieved by a sheet-like structure of the type stated at the outset, whose defining feature is that a coating is produced by treating at least one surface of the substrate layer by means of an electric corona discharge which takes place between high voltage electrodes and a grounded counter-electrode, with an aerosol containing a polymeric film-forming agent simultaneously being introduced into the corona discharge space during the corona discharge.

BRIEF DESCRIPTION OF THE DRAWING

The FIG. 1 of the drawing is a part schematic view, part cross-sectional view of the aerosol/corona treatment apparatus of the present invention.

DESCRIPTION OF THE PREFERRED EMBODIMENTS

Figure 1:
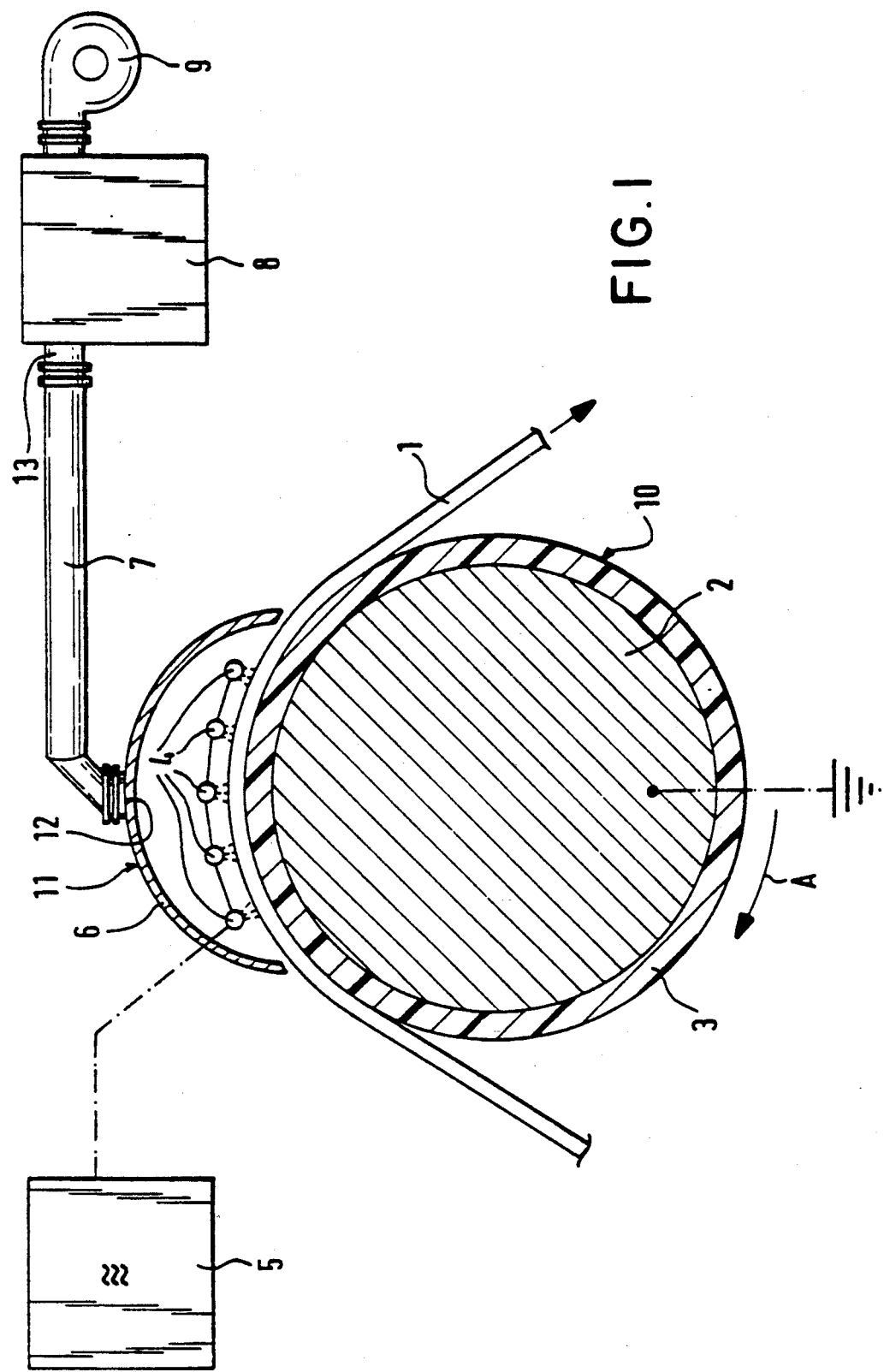

For the purposes of the present invention, it is possible in principle to use, for the substrate layer, all materials which have the difficulties stated at the outset as those experienced during processing due to excessively smooth surfaces, in particular polymers, which can be in the form of films or sheets.

Examples of such polymers are, in particular, polymer films of natural and synthetic polymers, such as cellulose, cellulose esters, polyvinyl chloride, polystyrene, styrene copolymers with butadiene, polycarbonate, polymers and copolymers of olefins, such as ethylene, propylene, butylene, methylpentene, etc., polysulfone, aliphatic and aromatic polyesters, polyimides, polyisobutylene, polymethyl methacrylate, polyphenylene sulfide, polyurethane, polyamide, polyaryl ether ketone, polyaryl ether ether ketone, polyaryl ether sulfone, polyamidoimide, polyether imide, etc., (cf. Ullmanns Encyclopadie der Technischen Chemie, Verlag Chemie, Weinheim, 4th revised and extended edition (1976), page 673 et seq.; Encyclopedia of Polymer Science and Eng., Vol. 7, John Wiley & Sons (1973), page 73 et seq.). The production of self-supporting, oriented or non-oriented films from the stated polymers is carried out by various known technologies, which are likewise described in the literature cited. The term self-supporting film is intended to be understood to include both monofilms consisting of one layer and multilayer films consisting of a plurality of layers of identical or different polymer materials, or laminates containing layers of plastics and of non-plastics, such as, for example, paper or metal.

The coating on the substrate layer is formed by the simultaneous action of an electric corona discharge in the presence of an aerosol containing film-forming agents. The corona discharge triggers and/or promotes reaction mechanisms which result in chemical surface modification of the treated substrate. It is assumed that, as a result of the corona discharge, the aerosol or the agents contained therein is or are firmly anchored to the substrate surface.

For the corona discharge, an alternating current voltage between 5,000 and 25,000 V is applied to the high voltage electrodes by means of a high voltage generator. The alternating current voltage between the high voltage electrodes and the earthed counter-electrode should be proportional to the transport velocity at which the substrate to be treated is moved through the corona discharge zone, i.e., at a higher transport velocity the alternating current voltage should be within the upper voltage range while at lower transport velocities a medium to low voltage in the range of 5,000 to 18,000 V can be set in order to achieve an effect of the same magnitude.

The aerosols can be produced with the aid of known two-material atomizing nozzles or preferably by means of piezoelectric ultrasonic atomizing systems. Aerosols can be produced using emulsions, preferably dispersions or solutions of organic polymeric binders, which are taken in solvents or dispersants, very particularly preferably in water.

A process for the treatment of the surfaces of plastics substrates by means of corona discharge with simultaneous spraying with an aerosol, and an arrangement for carrying out this process, have already been described in every detail in German Patent Application P 37 05 482.1, corresponding to U.S. Ser. No 07/156,572, filed Feb. 17, 1988, now U.S. Pat. No. 4,929,319 assigned to the assignee of the present invention.

Examples of the film-forming polymeric agents are homopolymers or copolymers based on acrylic acid or methacrylic acid or their derivatives, ncncrystalline copolyesters or copolyester ethers, which may contain alkali metal-containing building blocks, such as, for example, the sodium salt of 5-sulfoisophthalic acid, in amounts of from 1 to 50 mol percent, or mixtures of these. Acrylate-containing copolymers which are cross-linkable, for example with melamine, polyurethanes, polyolefins or ionomers, which are dispersed in water, are also suitable film-forming agents. Further examples are aqueous solutions or emulsions of bifunctional fluoropolyethers, in particular bifunctional derivatives, such as diols, dicarboxylic acids and diesters. Further lubricants which are added include monocarboxylic esters of glycerol with long-chain fatty acids, such as glycerol monostearate, and organosiloxanes, such as polydiorganosiloxanes. Via the choice of the film-forming agents, it is possible to impart to the substrate not only the sliding properties desired according to the invention but also further valuable surface properties, such as improved adhesion to applied materials, sealability, etc.

The amount of film-forming agent to be applied can be varied within wide limits and is preferably tailored to the particular relevant application.

In the process according to the invention, the film-forming agents are first dispersed, emulsified or dissolved in a solvent or dispersant, an aqueous solvent or dispersant preferably being used, and are then sprayed together with a carrier gas stream into the corona discharge space as an aerosol. The dispersions or emulsions generally have a solids content or droplet content of from 0.5 to 20 percent by weight, based on the total weight of the dispersion or emulsion, while the solutions have concentrations in the range from 1 to 30 percent by weight. It may be advantageous to increase the temperature of the carrier liquid to improve the dispersibilty or emulsifiability.

In the simplest case, air is used as the carrier gas for the aerosol, but is is also possible to use nitrogen or another inert gas, for example a noble gas. On the other hand, particularly advantageovs anchoring effects can also be achieved with reactive gases, such as, for example, with halogens, carbon dioxide, ammonia or formaldehyde, mixed with inert gases if necessary.

In the process according to the invention, the coating can be applied to the substrate layer off-line after the substrate has been produced. This applies particularly when sheet-like substrate layers are to be coated. However, the coating can also be applied just as well in-line, during the process for the production of the substrate layer. It is known that, for example, biaxially oriented films of thermoplastics are produced by extrusion of a melt and subsequent biaxial orientation, followed by heat setting. In this procedure, the coating can be applied before, between or after the individual stretching steps which take place one after the other, or can be applied before or after the heat setting.

Because of the particular application process according to the invention, the coating has particularly good adhesion to the substrate surface. The layer thickness of the coating usually corresponds to a weight per unit area of the substrate to be coated in the range of only 1 to 100 mg/m$^2$.

Suitable applications for the sheet-like structures according to the invention are all those applications where good sliding properties are desirable. For example, the use of packaging films on high-speed packaging machines or films for technical applications, such as, for example, adhesive tapes, magnetic tape films, capacitor dielectrics or substrate films for reprographic or photographic applications.

The invention is illustrated in more detail below with reference to FIG. 1 which shows an aerosol/corona apparatus for treating various polymer films. The apparatus consists of a generator 5, which is connected to a corona discharge apparatus 11. The generator 5 applies a high-frequency alternating current of high voltage to discharge electrodes 4 of the corona discharge apparatus 11. The metal core 2 of a roller 10 having a circumferential polymeric coating 3 serves as the grounded counter-electrode. A self-supporting polymer film web 1 to be coated is transported over the roller 10. A housing 6 encloses the discharge electrodes 4 of the corona discharge apparatus 11 and is connected via a line 7, for example a pipe of flexible tube, to an atomizing apparatus 8, in which an aqueous liquid is atomized to give a suspendible aerosol by means of a two-material atomizing nozzle or a piezoelectric ultrasonic system. A blower 9 is connected to the atomizing apparatus and conveys the carrier gas (air) for the aerosol through the atomizing apparatus into the corona discharge apparatus 11. The line 7 is connected to a pipe socket 13 of the atomizing apparatus 8 and to a pipe socket 12 of the housing 6.

The examples which follow are intended to give a clearer description of the invention and the reproducible advantages which can be achieved with the invention.

EXPERIMENTAL CONDITIONS

Various polymer films were treated by means of an aerosol/corona apparatus corresponding to the accompanying figure. Unless stated otherwise, the transport velocity of the self-supporting polymer films was 20 m/min. The corona power in each case was 1,000 W (corresponding to a setting of 5,500 V). The surface roughness was determined by measurements according to DIN 4768. The slip properties of the film are determined by measurements according to DIN 53,375. The friction were measured at five measuring points distributed over the entire film width.

To form a substrate layer, a pigment-free polyester raw material having a saponification value of 810 was melted into a film and formed by means of a slot die, and quenched on a cooled roller polished to a high gloss to give an amorphous film. The amorphous preliminary film was stretched longitudinally at 95° C. and then stretched in the transverse direction at 110° C. The stretching ratio per unit area being 13. The resulting 15 micron thick film was then heat-set at 230° C. (film temperature). The film was then coated using the apparatus described.

EXAMPLE 1

Figure 2:
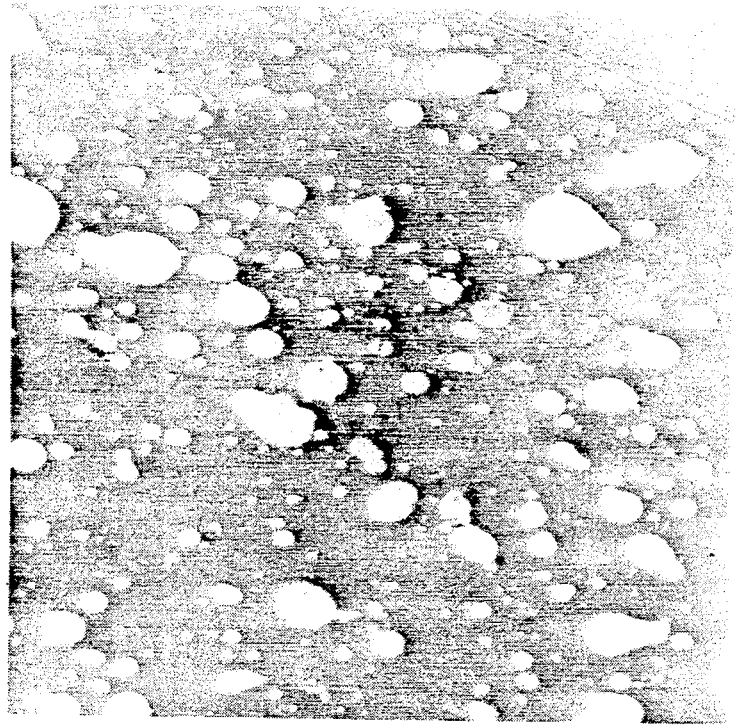
FIG. 2 is a scanning electron micrograph of the surface of a film of the present invention under 300 times magnification.
Figure 3:
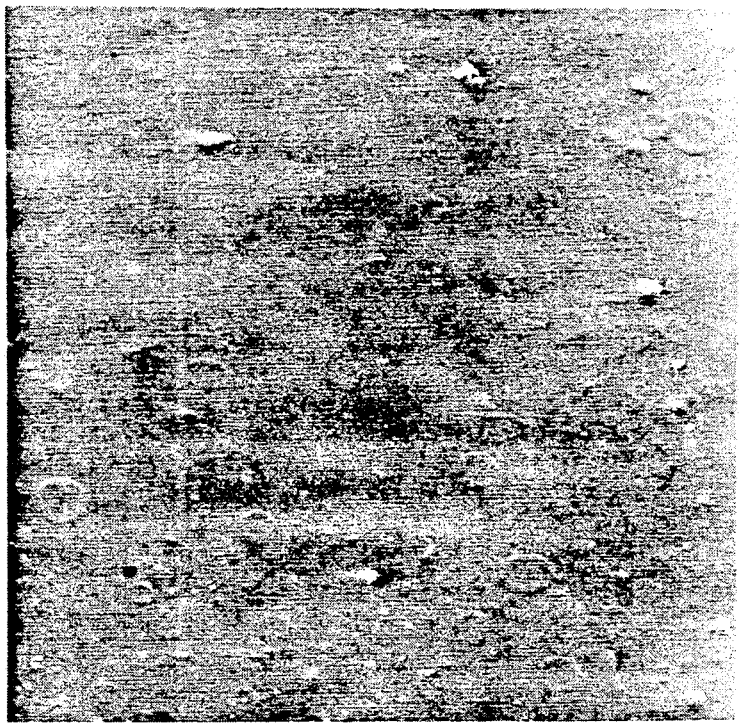
FIG. 3 is a scanning electron micrograph of the surface of a film of the present invention under 300 times magnification.

The film was treated during corona treatment, according to the invention, with a dispersion containing a crosslinkable acrylate and having a solids content of 4 percent by weight. The exact composition of the acrylate was as follows: 52 mol percent of methyl methacrylate, 43 mol percent of ethyl acrylate and 5 mol percent of methacrylamide. The acrylate was mixed in a ratio of 4:1 with a crosslinking agent based on an 80/20 mixture of melamine/formaldehyde. The coating was applied at a rate of about 20 mg per square meter of film substrate. FIG. 2 shows a scanning electron micrograph of the surface of the resulting film under 300 times magnification. This micrograph clearly shows how a texture resembling lunar craters was formed, in which large and small, more or less closed structures are distributed in a purely random arrangement over the entire surface of the substrate layer, corresponding to impact in each case with smaller or larger aerosol droplets. The coefficient of static and sliding friction (DIN 53,375) of the film was 33. The film haze was 1 percent, the haze being determined according to ASTM-D-1003-61, Method A.

EXAMPLE 2

Example 1 was repeated, except that the aerosol was formed with the aid of an aqueous dispersion containing a copolyester consisting of 65 mol percent isophthalic acid units and 5-sulfoisophthalic acid units (35 mol percent). FIG. 2 shows a scanning electron micrograph of the film surface produced according to Example 2, under 300 times magnification. A structure resembling a crater landscape was likewise recognizable, but, owing to the lack of crosslinking, the individual structural elements do not contrast in color with the background. The film haze according to Example 2 was 0.5 percent.

EXAMPLE 3

Example 1 was repeated by using an aqueous solution (concentration: 4 percent by weight) of polyvinyl alcohol. With the aid of the scanning electron microscopic method of investigation, no textures were detectable on the film surface thus produced.

EXAMPLE 4

To form a substrate, a polyethylene terephthalate raw material which contains 1,000 ppm of SiO, as an antiblocking agent was melted in an extruder, formed with the aid of a slot die into a film and quenched to give an amorphous preliminary film. The preliminary film was then stretched longitudinally at 95° C. and stretched in the transverse direction at 110° C. The stretching ratio per unit area was maintained at about 13. The resulting 50 micron thick film was then heat-set at 230° C. The heat-set film was then further treated by four process variants. The heat-set film was subjected to a corona treatment and a simultaneous aerosol treatment corresponding to the process according to the invention. The aerosol was produced from a 0.12 percent by weight aqueous solution of a bifunctional polyfluoropolyether of the formula

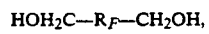

$$HOH_2C\text{---}R_F\text{---}CH_2OH,$$

where $R_r$ = polyfluoropolyether. The sliding friction according to DIN 53,375 measured at five points over the film width, was very uniform and was 0.14 to 0.15. The amount of coating applied to the film was about 1 mg per square meter of film.

The film obtained exhibited strong anchoring of the slip-improving coating to the substrate. The stability during sustained use or the anchoring of the coating under mechanical load was tested by wiping the film surface ten times with a cotton wool ball under contact pressure in the range from 1 to 5 kPa. The new sliding friction then measured shows no change compared with the coefficients of sliding friction initially measured.

COMPARATIVE EXAMPLE 1

The heat-set film was subjected to neither a corona treatment nor an aerosol treatment. The sliding friction was about twice as high as in the above mentioned example and was in the range from 0.28 to 0.32. The fluctuation in the sliding friction, measured over the film width, was small and a good uniformity of the friction over the film width was present.

COMPARATIVE EXAMPLE 2

The heat-set film was subjected to a corona treatment without an aerosol treatment. The sliding friction was about 2.6 to 2.7 times the value of the example according to the invention and was in the range from 0.37 to 0.40. The fluctuation in the sliding friction, measured over the film width, was small, i.e., the uniformity of the friction over the film width was good.

COMPARATIVE EXAMPLE 3

The heat-set film was subjected to an aerosol treatment without a corona treatment. The coating employed was the same as that in Example 1. The amount of coating applied to the film was also the same as in Example 1. Examples 1 and 2. It was about 1.6 to 2.1 times the value of the example according to the invention and was in the range from 0.22 to 0.29.

The fluctuation in the sliding friction, measured over the film width, was large so that the uniformity over the film width must be regarded as poor.

The results of the measurements of the sliding friction of the example according to the invention and of Comparative Examples 1 to 3 are summarized in the Table below.

TABLE 1

| Sliding friction according to DIN 53,375 measured at five measuring points over the film width | | | | | | Uniformity of the fiction over the film width |
|---|---|---|---|---|---|---|
| Measuring Points | 1 | 2 | 3 | 4 | 5 | |
| Example | 0.14 | 0.15 | 0.14 | 0.15 | 0.15 | Very good |
| Comparative Example 1 | 0.30 | 0.29 | 0.31 | 0.28 | 0.29 | Good |
| Comparative Example 2 | 0.38 | 0.40 | 0.37 | 0.39 | 0.38 | Good |
| Comparative Example 3 | 0.22 | 0.28 | 0.23 | 0.29 | 0.26 | Poor |

That which is claimed is:

1. A process for the production of a film structure, comprising treating at least one surface of a substrate layer by means of a corona discharge operated at an alternating current voltage between 5,000 and 25,000 V, said corona discharge occurring between a high voltage electrode and a counter electrode; and introducing an aerosol containing a polymeric film-forming agent with a carrier gas into the corona discharge.

2. A process as claimed in claim 1, wherein treating said substrate includes moving said substrate through the corona discharge zone at a transport velocity proportional to the level of the alternating current voltage at which the corona discharge is operated.

3. The process as claimed in claim 1, wherein the aerosol is introduced into the corona discharge zone with the aid of two-material atomizing nozzles or piezoelectric ultrasonic atomizing systems.

4. The processes claimed in claim 1, wherein said polymeric film-forming agent is dispersed or emulsified in a solvent or dispersant and said dispersion or emulsion has a content of polymeric agent of 0.1 to 20% by weight, based on the total weight of the dispersion or emulsion.

5. The process as claimed in claim 1, wherein the carrier gas used is a gas, selected from the group consisting of air, nitrogen or a noble gas.

6. A process as claimed in claim 1, wherein the carrier gas used is a gas, selected from the group consisting of halogen, carbon dioxide, ammonia, or formaldehyde, or a mixture of said gases with gases selected from the group consisting of air, nitrogen, or a noble gas.

7. A process for forming a polymeric film structure with improved slip characteristics and reduced friction properties, comprising: forming a polymeric film structure; corona treating at least one surface of said structure; and coating said structure simultaneously during said corona treatment by means of an aerosol, said aerosol comprising a carrier gas and a dispersant, said dispersant comprising a solvent and a film-forming agent, said coating applied at a rate of from 1 to 100 mg per square meter of said structure.

* * * * *